United States Patent

Face et al.

[15] 3,668,307

[45] June 6, 1972

[54] TWO-WAY COMMUNITY ANTENNA TELEVISION SYSTEM

[72] Inventors: William W. Face, Saline; Harold W. Katz; Murray H. Miller, both of Ann Arbor, all of Mich.

[73] Assignee: KMS Industries, Inc., Ann Arbor, Mich.

[22] Filed: Mar. 30, 1970

[21] Appl. No.: 24,009

[52] U.S. Cl. .......................... 178/5.6, 178/DIG. 13, 325/308

[51] Int. Cl. .......................... H04n 7/18

[58] Field of Search .......................... 325/3, 5, 54, 308, 309; 178/DIG. 13, 5.6, 5.8 R, 6; 340/163; 179/15 AS

[56] References Cited

UNITED STATES PATENTS

| | | | |
|---|---|---|---|
| 3,423,521 | 1/1969 | Kriessen et al. | 325/309 |
| 3,445,815 | 5/1969 | Saltzberg | 340/163 |
| 3,278,677 | 10/1966 | Fannoy | 178/DIG. 13 |
| 3,444,521 | 5/1969 | Breesey | 340/163 |
| 3,230,302 | 1/1966 | Bruck et al. | 178/DIG. 13 |

*Primary Examiner*—Robert L. Richardson
*Attorney*—Barnes, Kisselle, Raisch & Choate

[57] ABSTRACT

A two-way community antenna or closed circuit television system or community cable television system which permits two-way communication (including voice communication) through a transmission center from and between various terminals, such as schools, homes, hospitals, doctor's offices, community centers, industrial sites and the like. A control center including a properly programmed digital computer continuously interrogates the system over a forward control channel and receives responses from the terminals over a return control channel. The computer also controls transmissions between the transmission center and the terminals and between the terminals via the transmission center. Each terminal is provided with a control unit for communication with the control center. The system utilizes an appropriate bridging amplifier or other suitable means to convert to a two-way link a portion of the transmission cable interconnecting the transmission center and the terminals. The system also contemplates the use of channel allocations between 0 and 300 MHz, it being practical to allocate in this range certain portions for return transmission channels for programs originating at the terminals and certain portions for extra forward transmission channels for special programs originating at the transmission center.

13 Claims, 8 Drawing Figures

Figure 1:
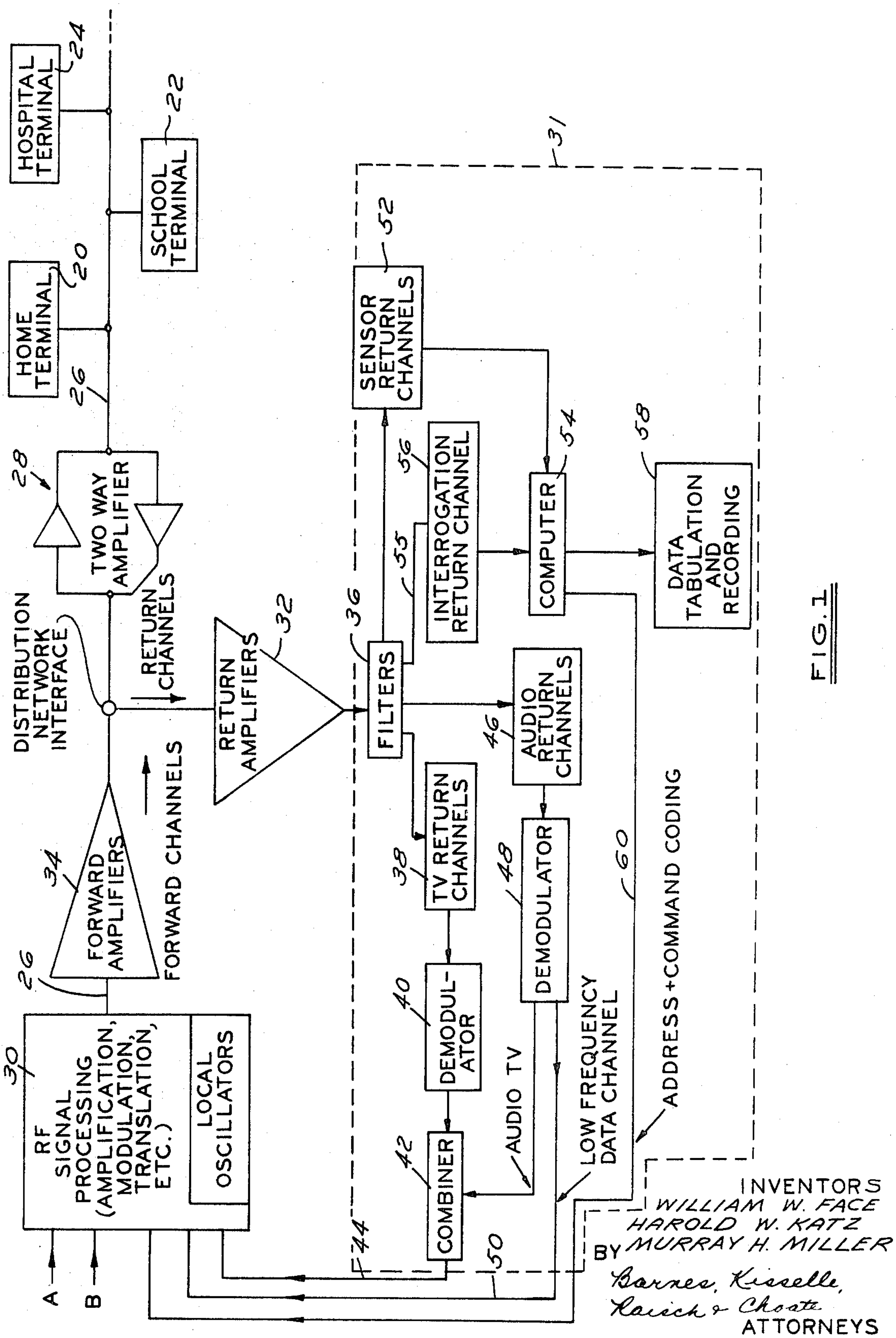

INVENTORS
WILLIAM W. FACE
HAROLD W. KATZ
BY MURRAY H. MILLER
Barnes, Kisselle, Raisch & Choate
ATTORNEYS INVENTORS
WILLIAM W. FACE
HAROLD W. KATZ
BY MURRAY H. MILLER
Barnes, Kisselle, Raisch & Choate
ATTORNEYS

INVENTORS
WILLIAM W. FACE
HAROLD W. KATZ
BY MURRAY H. MILLER

Barnes, Kisselle, Raisch & Choate
ATTORNEYS

INVENTORS
WILLIAM W. FACE
HAROLD W. KATZ
BY MURRAY H. MILLER

Barnes, Kisselle, Raisch & Choate
ATTORNEYS

INVENTORS
WILLIAM W. FACE
HAROLD W. KATZ
MURRAY H. MILLER
BY
Barnes, Kisselle, Raisch & Choate
ATTORNEYS

WILLIAM W. FACE
HAROLD W. KATZ
MURRAY H. MILLER
INVENTORS

BY

Barnes, Kisselle, Raisch & Choate
ATTORNEYS

TWO-WAY COMMUNITY ANTENNA TELEVISION SYSTEM

The invention relates to a community antenna television (CATV) system or other closed circuit television system with the capability of two-way communication between the terminals of the system. The invention also provides a method of two-way communication in such a television system.

The current operation of community antenna television is basically to use a single antenna to receive broadcast TV signals and channel them through a coaxial cable system which directs the television signals to the various remote terminals which, for the most part, consist of homes.

The coaxial cable is commonly carried on telephone poles to the terminals which may number many thousands of units. The television programs are received as a broadcast from commercial stations and relayed through a transmission center or head end without alteration to the subscribing home terminals. In general, this has been accomplished to bring TV programs to remote areas where the signal strength from broadcasting stations is too weak for the individual home television receivers.

Two particularly notable characteristics common to conventional CATV systems are:

a. Only partial use is made of the information carrying capability of the coaxial cable or, in general, of the more restricted capability imposed by various components used in the distribution system such as amplifiers and couplers; and b. The signal distribution system design and construction is such that signal flow paths are all directed away from the transmission center or head end of the system so that only passive reception of signals from the transmission center is permitted a subscriber by the system.

The present invention contemplates a so-called head end or transmission center which can transmit by cable to various outposts or terminals which are joined with the system by a practically noise-free, extremely wide band (VHF-UHF) non-radiating communication network capable of transmitting information not only from the transmission center but also from each terminal to any other terminal in the system. It is intended that each terminal contain a TV receiver and that simple equipment can be added to generate new information, such as voice or video signals.

The system contemplates the use of transmission lines, such as coaxial cables, which can transmit bilaterally with the use of a circuit to be disclosed.

The invention also contemplates major extensions of the capabilities of conventional or CATV or closed circuit television systems, and in consequence, a fuller realization of the potential implied by the CATV concept. This is accomplished through the concerted effect of the following additions and modifications to a conventional CATV system:

a. The design of a signal distribution system or the addition of components to a conventional signal distribution system to permit bilateral signal transmission, i.e., from a subscriber's terminal to the transmission center as well as from the transmission center to the terminal;

b. The provision of a control center including a programmed digital computer to provide the transmission center means of supervising and controlling the flow of signals into and through the distribution network to an extent to which individual subscribers or selected groups of subscribers may be authorized unique access to one or another service for specified periods of time in either a one- or two-way mode;

c. The provision to subscribers of an inexpensive control which, by virtue of its design, permits an authorized subscriber (as determined by the programmed computer at the control center) controlled access to the signal distribution network and hence a capability of originating signals at his terminal for transmission to the transmission center and thence to the terminals of other selected subscribers, all under control of the control center;

d. The provision of components, concepts and operating principles in the control center to permit the transmission center to delegate part of its supervisory authority to selected terminals for extended periods of time; and e. The provision of a capability, in part used to support other capabilities as described in the preceding items, by which the control center may automatically monitor system operating status, tabulate system utilization statistics, and provide general accounting services for management of the system.

In consequence of the addition and modifications described, there is provided a communication system in which several groupings of a large number of subscribers, under the supervision and control of a control center may simultaneously be involved in either passive or active interaction with a variety of programs transmitted over the signal distribution network.

GENERAL APPLICATIONS OF THE SYSTEM

From the above, it will be apparent that there are numerous fields of application of the invention. In the field of education, the advantages of two-way communication which permits a question and answer approach will be evident. This can be used for special education courses for adults, for home-bound or hospitalized children, or for residents in underprivileged areas. The educational TV stations could participate as a source of programs as well as the local schools.

In connection with governmental activities, council meetings and other meetings of representative business could be covered by a two-way system which would permit audience participation.

In the medical field, in addition to the educational features, it would be possible for close consultation of physicians as well as a physician-patient relationship to be accomplished. This could be done under full security without exposure to other than authorized persons. It would also be possible to use what is called a sensor control connection so that vital measurements such as body temperature, blood pressure, heartbeat and so on of patients at a home could be monitored continually or at suitable intervals.

The system can also be used in connection with the playing of games to permit large numbers of viewers to observe and also participate. In the field of retail merchandising, purchases could be made directly by the system and a record kept of the request so that suitable deliveries could be made.

Other fields of application include auctions, time-shared computers, and the hooking in of automatic burglar and fire alarms or the remote control of on-off appliances such as stoves, heating units and so on.

An important feature of the present invention is that all communication within the system is controlled by a properly programmed computer in a control center. More specifically, the voice channel established between terminals via the transmission center is supervised by the computer so that only a single channel is required to permit voice communication between one terminal and several other associated terminals. Consequently, only one terminal at a time has access to the voice channel, thereby eliminating the necessity of providing a plurality of separate voice channels to simultaneously service a plurality of terminals, as would be required in a system not provided with computer supervision.

Another important feature of this invention is the provision of an inexpensive control unit at each terminal to be used in conjunction with the TV receiver at each terminal and with other optional devices to provide the two-way communication between terminals and between each terminal and the control station, all under the control of the computer in the control center.

Other objects and features of the invention will be apparent in the following description and claims wherein the principles of operation as well as the apparatus for achieving the operation is described in connection with the best mode presently contemplated for the system.

Drawings accompany the disclosure and the various views thereof may be briefly described as:

FIG. 1, a block diagram illustrating a signal traffic pattern which can be utilized to carry out the invention.

Figure 2:
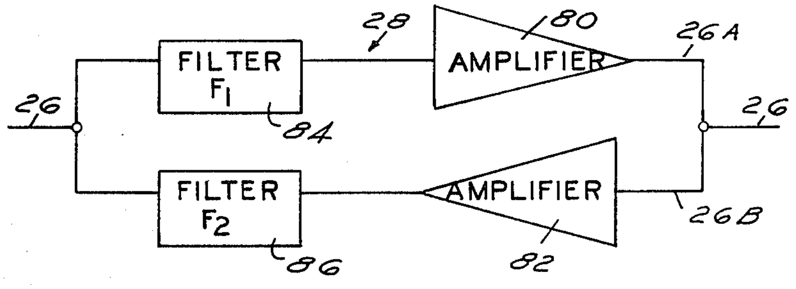

FIG. 2, a diagrammatic view of a bridging amplifier conversion which can be used with a bilateral cable.

Figure 3:
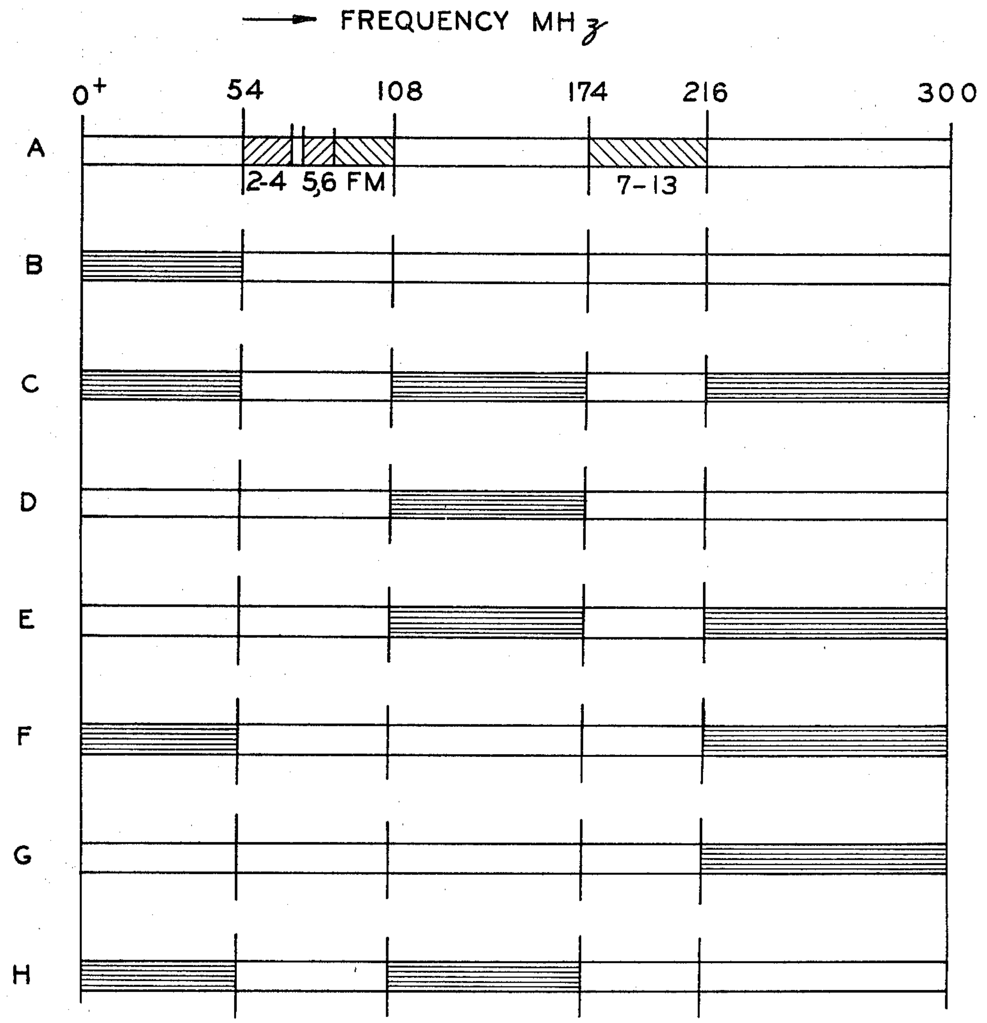

FIG. 3, an illustration of spectrum partitioning between forward and reverse channels.

Figure 4:
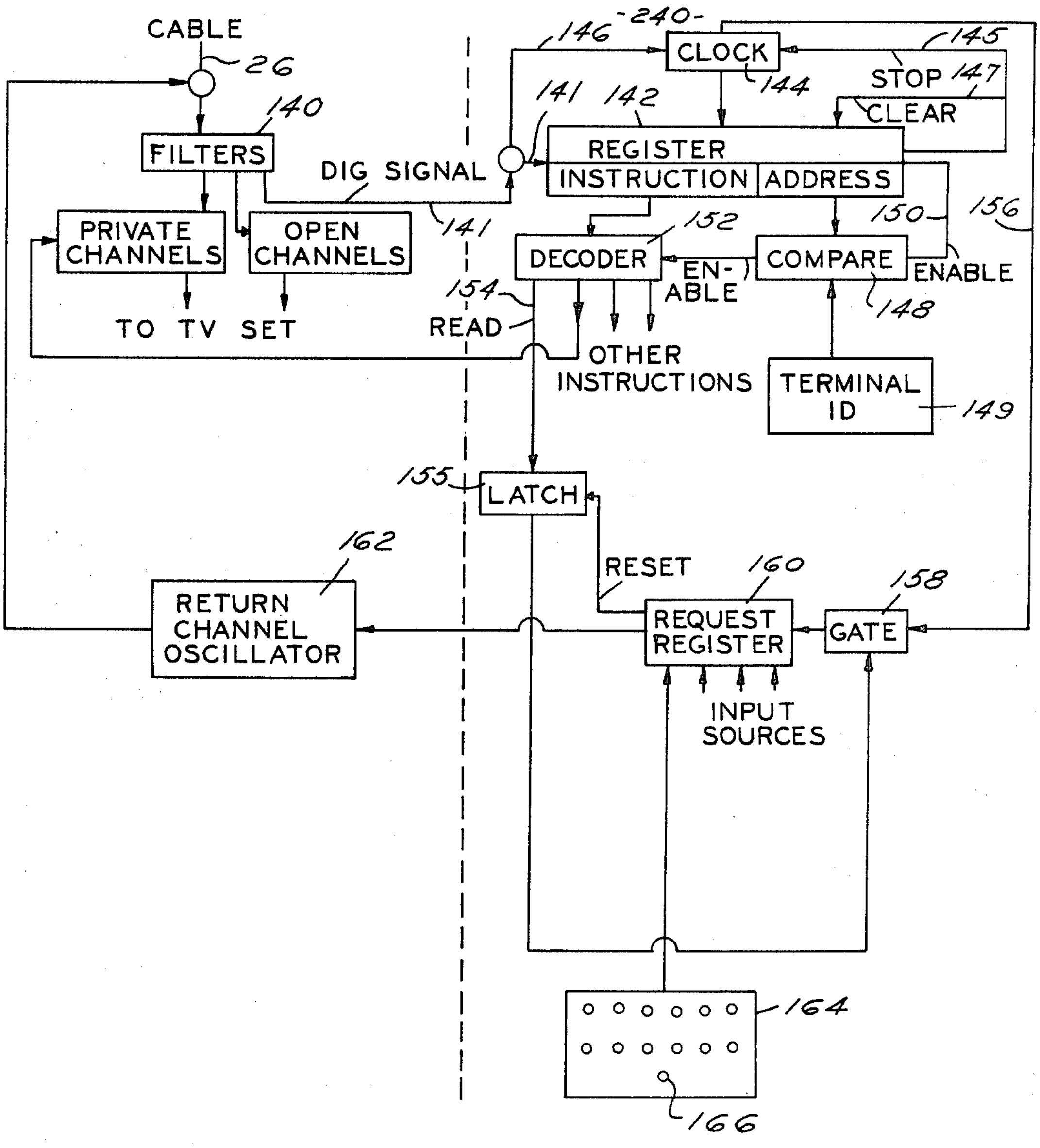

FIG. 4, a block diagram of an interrogation subsection of a subscriber terminal.

Figure 5:
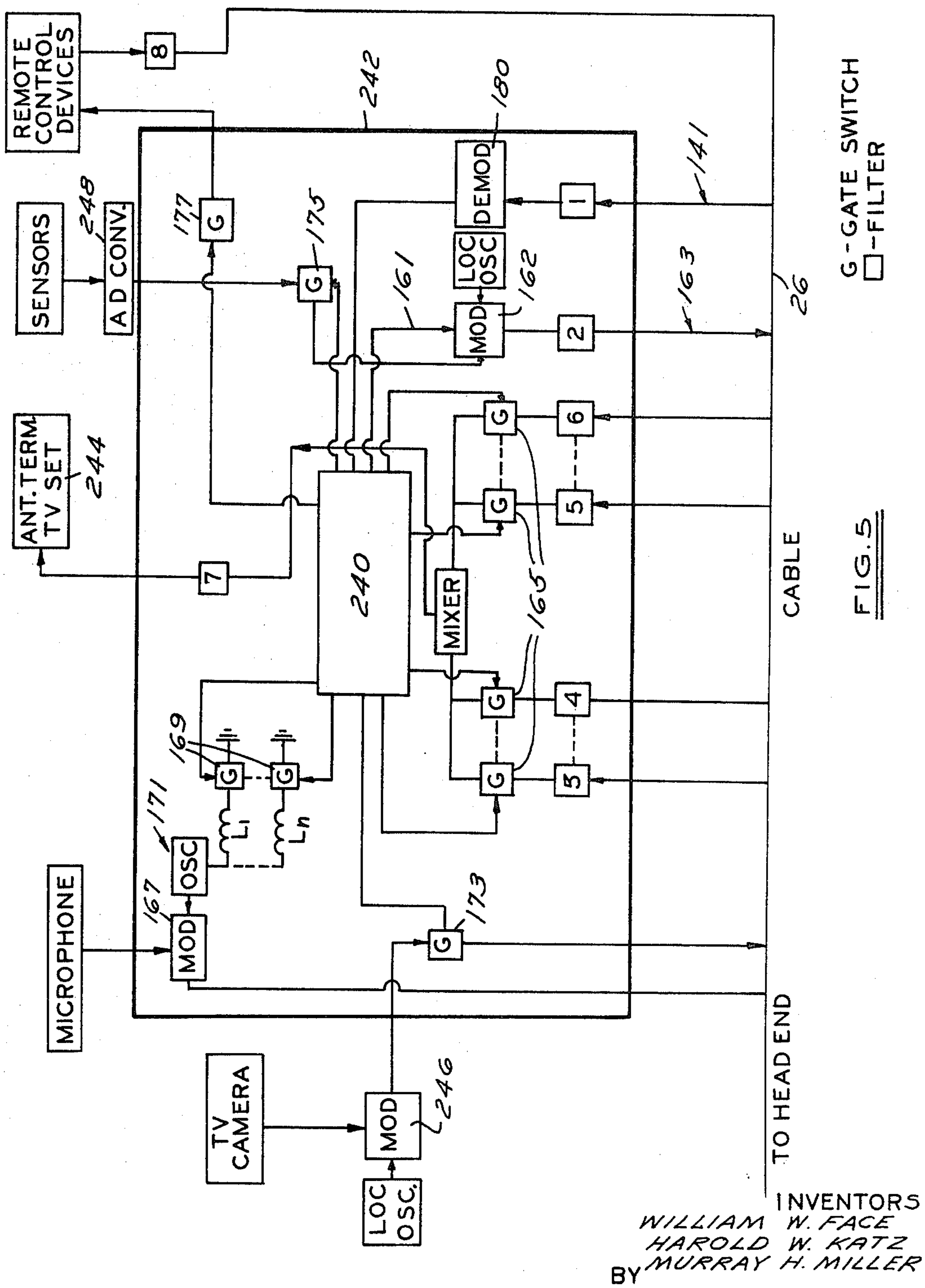

FIG. 5, a block diagram of the relationship of a digital control block to circuitry in a home terminal.

Figure 6:
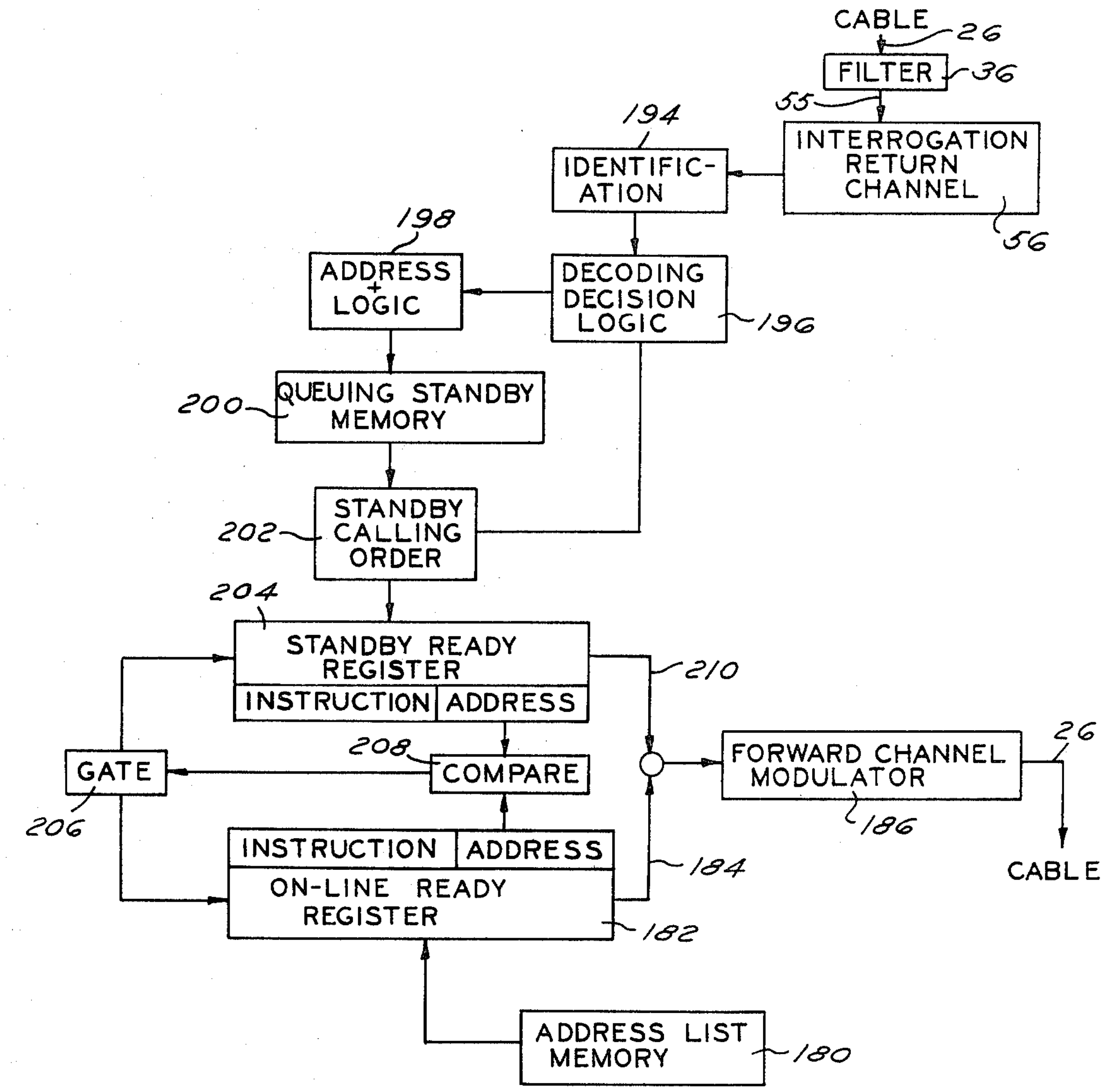

FIG. 6, a block diagram of a control center interrogation system.

Figures 7A, 7B:
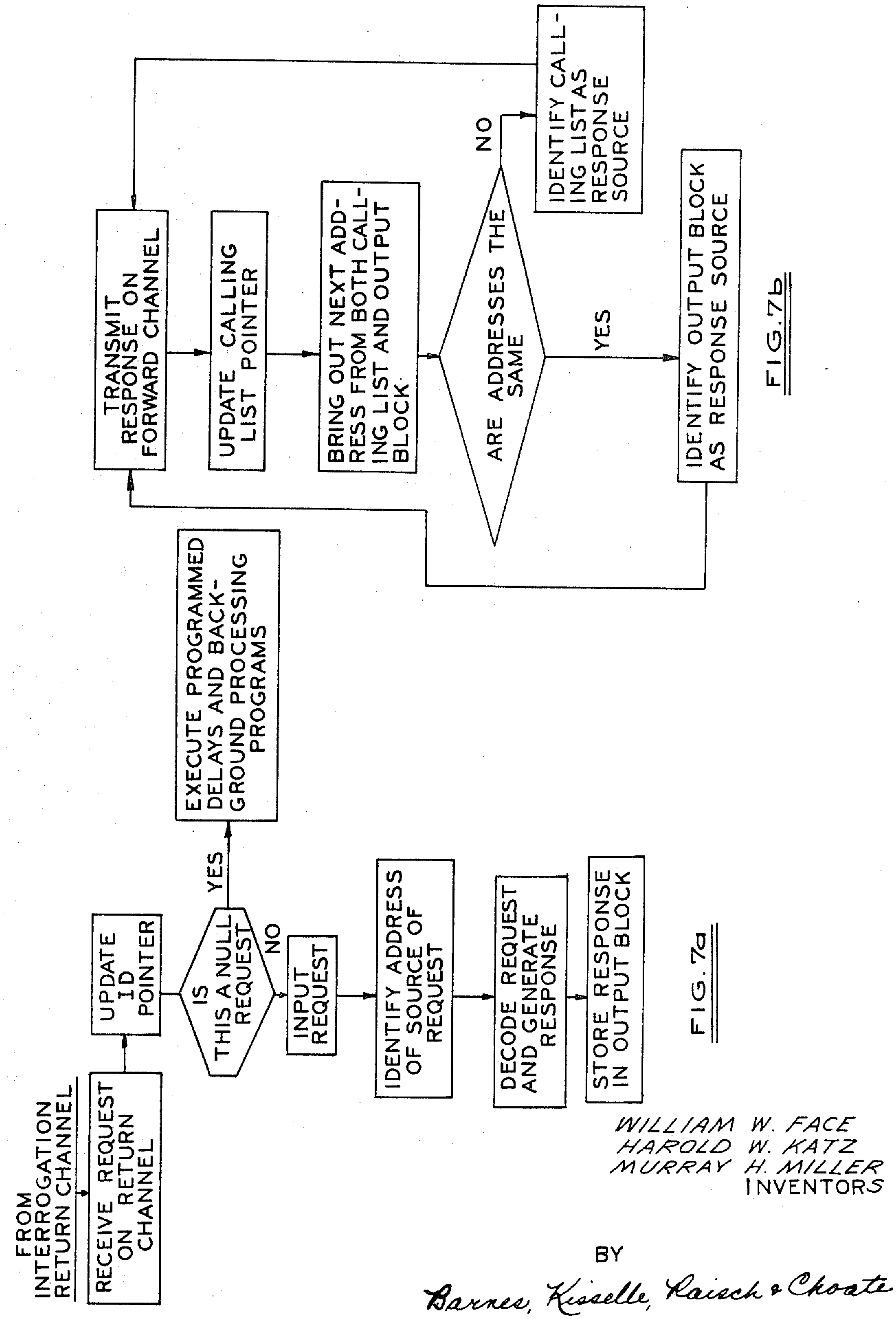

FIGS. 7*a* and 7*b* are flow diagrams illustrating the programs of a computer for two operations of the system.

GENERAL DESCRIPTION OF THE TWO-WAY SYSTEM

System Traffic Supervision and Control

Although there are some broad generic similarities in their general nature, the methods, concepts, and operating principles of the invention differ basically from those associated with conventional telephony. In conventional telephony, a subscriber may request access to the system at an arbitrary time, for connection to any other subscriber; there are ordinarily many requests entered effectively simultaneously for such paired connections. Access is provided only when the density of simultaneous requests is within a statistically predetermined system capability and long delays in access, particularly during peak loading periods, are not uncommon. Even after access is authorized, completion of the desired connection must follow and is dependent on a successful search for an unused telephone channel, and on whether the terminal called is already being used.

For CATV applications, it is neither necessary nor even desirable that subscribers be provided random access to the system. On the other hand, it is not desirable in the provision of other than extraordinary services that long delays be permitted between a request for service by a subscriber and the appropriate response.

The method used in the invention is, in general terms, described as follows. Each subscriber terminal is furnished with a control unit which includes, among other elements of its design, a means of permanently storing a digitally coded identification address assigned uniquely to each terminal.

In addition, two communication channels of the signal distribution network are reserved for the exclusive continual use of the supervisory and control systems. One of these channels is a "forward" control channel, i.e., it conveys signals from the control center to subscriber terminals. The other channel, the "return" control channel is used to convey signals from subscriber terminals to the control center.

At the control center there is generated and placed into the forward control channel for distribution to all terminals a series or list of digital code groups, one code group for each terminal (although "dummy" groups may also be generated for other than the particular purpose considered now). Because each code group contains the unique address of a terminal, the control center can address the terminals in random fashion; however, the invention as described below generally refers to sequential addressing of the terminals through the full list of addresses in each cycle.

In the preferred mode of practicing the invention, each code group consists of three subgroups. The first subgroup is a locator bit which is used to identify the beginning of a code group. In conjunction with an a priori fixed overall code group length and ordering, it also marks each bit of a code group.

Following this locator bit is a second code subgroup of fixed length into which is coded the unique address of the terminal with which the code group is to be associated.

The remaining or third code subgroup is a coded instruction for an action to be taken at the addressed terminal.

As stated previously, the list of code groups is generated and inserted into the forward control channel serially. In its due time each terminal receives the full list so generated. With the help of the locator bit, the address portion of the code group is compared with the permanently stored terminal address. If the two addresses do not match, no action is initiated and the processing continues with the next code group in sequence.

When the match is obtained, it causes an enabling signal to be generated which permits the instruction portion of the code group being considered to be transferred out of the address comparison circuits and into other processing units in the terminal control unit, i.e., the instruction is decoded by the terminal to which the instruction has been addressed.

The action then taken in the terminal depends on the instruction, i.e., which of the decoder output lines is energized. For immediate illustrative purposes, it will be assumed that the decoded instruction corresponds to an inquiry from the control center as to whether any service is requested and, if so, what service is requested. This instruction would be the most common one, i.e., it would be automatically generated in the control center and transmitted by the transmission center unless changed by means described later.

The nature of the processing via the forward control channel is such that each terminal is interrogated at least once during each cycle through the address list and so provided with an opportunity to communicate with the control center. Even at very modest data rates many thousands of subscribers can be interrogated each second.

Since the address list is generated serially and similarly transmitted over the forward control channel, there is no mutual interference between terminals, i.e., the address comparison process at one terminal proceeds apart from the processing at any other terminal.

In general, many terminals would desire service from the transmission center during any interrogation cycle. Since the return control channel is shared by all terminals, at least over some part of the signal distribution network, care must be exercised to control and direct return control channel traffic to the control center so as to properly identify the originating terminal for a particular request, and to prevent interference between requests.

If the order in which the address list is called into the forward control channel is properly chosen, it is possible to provide each terminal with a segment of the return control channel traffic pattern reserved exclusively for the use of that terminal. For example, if the address list is called in order of increasing distance from the transmission center, measured along the distribution network, the times at which address matches are made by the terminals will be ordered in the same sequence as the calling order, i.e., the nearest terminal will accept its instruction before the next nearest terminal accepts its instruction, and so on down the list. Further, the time interval between acceptance of instructions by two successively ordered terminals will be no less than the duration of a complete code group.

In other words, when an address match occurs at a particular terminal, and an instruction is accepted, it is known a priori that no other match will occur until after at least a minimum time. It is also known a priori that the next match which occurs will be made by a terminal further removed from the transmission center. Since all signals on the return control channel propogate at the same speed, there has thus been reserved for each terminal exclusive use of a segment of the return control channel traffic pattern. These reserved segments are used in the following manner.

Within the control unit at each terminal there is provided a digital request shift register whose capacity is no greater than the length of an interrogation code group; it may be less if so desired. Several inputs are provided from which the register may be loaded but in its most frequent use and for the use pertinent to the present description, the register is loaded manually by a subscriber. Manual loading can be accomplished in many ways, of which the most likely to be used is a set of binary switches or push buttons.

In its inactive state, the register is preferably connected to the return control channel and is automatically loaded with a null code, i.e., a code which when received by the control center will indicate that the interrogation system is operational but no service is requested; this arrangement has advantages in system maintenance. However, it is also possible merely to leave the register disconnected from the return channel.

When the terminal accepts the "inquiry" instruction from the forward control channel, i.e., a match of addresses has occurred, the request shift register is stepped thereby emptying or dumping its contents into the return control channel within the appropriate reserved segment of the return traffic flow. The register output modulates an appropriate carrier or a pulse oscillator to form the actual return control signal which is transmitted via the transmission lines such as a coaxial cable, to the control center.

If some service is desired by the subscriber, the appropriate request code is set up on the loading switches or push buttons on the terminal control unit, and a "read" switch is depressed. The read switch transfers the request code into the register. By this means, the request code is read out of the register and sent to the computer in the control center.

It is not necessary to affix an address to a request code to identify the originating terminal to the central station. As described previously, the order in which requests, or more exactly, the traffic segments reserved individually for requests, are received by the control center, is the same as the forward control channel calling order, i.e., it is a priori known. Hence, the control center need only count segments (either time intervals or null codes) received relative to the time at which a cycle of the addressing begins. A request code received is then automatically identified and "tagged" at the control center.

After receipt and identification of the origin of a request at the control center, a computer (either a special purpose computer or a properly programmed digital computer) checks the legitimacy of the request, records whatever statistics system management calls for, determines the appropriate response, and prepares an addressed code group with the appropriate instruction or command code. By means described in detail later, this code group is substituted for the more usual inquiry code group on the next call for the address involved from the address list. This replacement code group is transmitted over the forward control channel; the processing is no different from that described earlier except that when decoded at the addressed terminal a different decoder output line is energized. In consequence, instead of just "dumping" the request register, one or another gate is enabled so that the terminal is permitted to accept a channel, provide access to an audio or video return channel (other than the supervisory channel), or any of an almost boundless number of actions is initiated, as determined by the terminal's response or request and when authorized by the control center.

In partial summary of this aspect of the two-way CATV operation, it can be noted that:

a. Each terminal in turn is provided with the opportunity to fill a message segment reserved for its exclusive use;

b. The control center is continually available to receive the message;

c. Propogation speeds along the distribution network and data rates available from "off-the-shelf" digital electronics are fast enough, so that in terms of human reaction times the interrogation and response cycle is nearly instantaneous; and d. A service request code (or any legitimate code, for that matter) may be prepared for entry into a terminal request register by a subscriber at his leisure and at an arbitrary time, with assurance that it will be transmitted effectively at the instant he desires. Further, since except for exceptional service, the control center logic acts over a time interval which is short compared to the address cycling time (which is itself short) the response to a request is nearly instantaneous. The subscriber is thus involved with a rapid response time-shared system and although in regards to the interrogation channels his request options are limited, there could easily be, say, several hundred options for a single entry into the terminal register.

Specific Example

Assume, for illustrative purposes, that each code group inserted into the forward control channel contains 24 bits. The code groups are separated in time to provide for timing allowances.

Of the 24 "active" bits, one is the locator bit for control purposes at the terminal, with the remaining 23 apportioned 17 for the address and 6 for the instruction. This assignment accommodates 131,072 terminals and allows 64 control codes.

At a modest one megaband data rate, which would require a channel bandwidth of about 2 to 3 megahertz, the entire 131,072 terminals are addressed in less than 3.4 seconds. (An order of magnitude increase in data rate is available with off-the-shelf components. There is, however, a commensurate increase in channel bandwidth which is required; if needed, the bandwidth is available on the cable.) It is also possible to use more subtle coding concepts to increase the efficiency of the interrogation.

Still another method for decreasing the inquiry and response time is to interrogate groups of subscribers simultaneously on two or more different carrier frequencies.

It will be recalled that buffer time is associated with each forward control channel code group. If the buffer is assumed to be equivalent to two spacer bits and assuming a nominal signal propagation speed on the cable of half the speed of light, and using a one microsecond clock period, there is permitted about a $\pm$ 1,000-foot resolution in determining the relative order in which terminal addresses should be called, i.e., within this resolution the buffer time will assure non-overlap of the message segments on the return channel. This simplifies the allocation of addresses to terminals in close proximity, particularly if such terminals are installed at different times.

Program Origination From Terminals

A major feature of the system, established through the design of the home terminal, is the ability of the control center to delegate many of its functions to any one or even several subscriber terminals. This is done basically by authorizing the use of one of several return transmission channels permanently or temporarily reserved by the control center for this purpose.

Authorization of such a channel is accomplished by having the control center insert the appropriate coded instruction into the address sequence in place of the basic inquiry code. The decoder in the control unit in each of the terminals so addressed provides an enabling pulse on its appropriate output line to a gate. The gate permits a modulated carrier at the authorized frequency access to the transmission line, e.g., coaxial cable.

For audio transmission return channels it is economically feasible to include in each terminal several (say, 10) fix-tuned oscillators, each modulated from the same microphone and connected to the cable through gates controlled by the decoder in the terminal's control unit. Alternatively, a single oscillator may be employed; the enabling signal would cause tuning elements to be connected to provide the authorized carrier.

In specific systems it may be preferable to generate carrier signals at the end of each leg of the distribution system, using the cable to convey the carrier to the terminals; terminals would have access when authorized to an assigned carrier. A modification of this approach is to provide each terminal with a mixer which is used to offset the modulated carrier frequency from the general distributor carrier frequency authorized for use. This avoids possible difficulties which may arise in superimposing a modulated carrier component and an unmodulated component in the return transmission channel.

The same sort of provisions may be made for video and digital data return signals. However, the complexity and expense of auxiliary equipment to generate video signals, for example, make it preferable to include carrier generation and modulation with the auxiliary equipments, i.e., provided separately from the basic subscriber terminal. The terminal would simply provide access to the cable through a suitable connector and through a gate controlled from the control center. Filters may be associated with each gate to limit cable access to the transmission channel assigned.

Once a two-way connection through the transmission center or head end is established, the control center may be programmed to act on data arriving on an authorized channel as it would on data from any other source feeding the head end. One specific action could be the redistribution of data from a return transmission channel of the cable to a forward transmission channel of the cable, and thence to all of the terminals or to a selected group of terminals enabled by an instruction to receive a "private" channel.

Private Channels

A number of forward transmission channels, TV or radio, may be designated as "private" channels and assigned carrier frequencies not accepted by standard home TV tuners. Access to these channels would require either a special tuner or frequency converter. In addition, authorization from the control center would be required to have an inhibiting filter bypassed. In fact, through an appropriate arrangement of electronically operated mechanical switches or electric switches, such as diodes or varactors, no channel, either "free" or private, is available to the subscriber unless he specifically requests a channel through the use of the push button system on the home terminal control unit. Access to a channel is thus always under the control of the computer in the control center. This capability provides for a wide variety of new applications. Additional security could be provided by coding or scrambling the private signals, requiring the appropriate decoding key for reception.

Audience Participation Remote Control

An important aspect of the capability of the two-way CATV system is the complete control exercised by the control center over the flow of signal transmissions; voice, video, data, etc.; all signals, including those originating at a subscriber terminal, pass through the control center and/or the transmission center before being retransmitted or otherwise processed. Because of this the transmission center's facilities can be used to supplement and support programs originating at a terminal.

One specific illustration having many of the characteristics of more general applications is a classroom situation, i.e., a situation in which a teacher's lecture to a class at one location is simultaneously cablecast to a selected set of subscriber terminals.

Some capabilities which may be desired for such an application are:

a. A roll-call for remote participants in the class;

b. Having remote participants take examinations "on the cable;"

c. That the teacher be made aware of and have identified any remote participants who wish to ask questions, with the teacher able to select the order in which he wishes to accept the questioners, when he wishes to accept the questions, and for how long he wishes the questioners to be recognized;

d. That all participants hear authorized questions raised by any participant;

e. That the lecturer be able to transmit a question to only a particular participant; and f. That the teacher be able to switch the program origination point for, say, video material to another terminal.

The degree to which the various capabilities cited as well as others not mentioned can be usefully implemented is constrained by simple human limitations; some of the capabilities cited while technically quite feasible are impractical for a class enrollment of, say, 1,000. On the other hand, for a modest size of class involving, say, 100 terminals many conveniences become practical.

The teacher may be supplied with an auxiliary device connected into his terminal which may be termed generically a Response Identification and Control Terminal (RIACT).

The RIACT would contain a digital memory into which is loaded the terminal address of each person enrolled in the course; several people may have the same terminal address. On the face of the device would be displayed the name and other information for each enrollee. Associated with each name would be several switches and lights.

One light could be used to indicate attendance, i.e., prior to the start of the lecture, or even during the lecture if desired, enrollees would request "enrollment" of the control station by inserting the appropriate code into a terminal request register. If appropriate, the control station would authorize access to the channel assigned to the lecture and also transmit to the RIACT the terminal address from which the enrollment request originated. The RIACT would compare the address received against its memory, causing the attendance lamp to be lit when a match is made. (The control center can store such requests temporarily, releasing them at a rate commensurate with the RIACT acceptance rate—at worst milliseconds are involved for each address.) The request for enrollment can automatically provide the requestor with new interpretations of the request codes pertinent to the program requested (including a cancellation code).

The same process can be used to indicate that a request for permission to ask a question has been received from a particular terminal; the request code would be decoded so as to cause a second lamp to be lit. A single switch associated with each participant's identification could be used to load that participant's address and an authorization code into a register read by the control center; the control center would then authorize the terminal access to a return transmission channel, demodulate the return carrier and insert the communication onto the forward channel program carrier for the entire class to hear. Access to the return channel is denied by the central station when the RIACT register no longer contains the coded consent of the lecturer, i.e., he opens a consent switch.

The RIACT could also have a switch which loads its register with a command for the control center to cancel all outstanding requests.

The lecturer may also direct a question to a particular participant, and then instruct the control center to authorize access to a return transmission channel for that participant's terminal using the switch described above.

A variation on these procedures is an instruction to the control center to select at random from the class as a whole or from just those wishing to respond (as indicated to the control center), indicating its choice to the lecturer.

It is clear that the variety of services that can be provided is virtually unlimited, except by considerations of practicality and economy. Only one other type of service function of some special merit will be cited.

The lecturer may transmit data to the transmission center for retransmission to another terminal where it is loaded into a computer and processed. The computer output could be presented on a visual display at the computer, i.e., the lecturer could temporarily transfer the video program origination to a terminal located at the computer with the lecturer maintaining the option of transmitting audio to the control center for insertion onto the video signal.

Even though the transmission center or head end of the CATV system would normally be physically in the same location as the control center including the computer, it is to be understood that the control center may be physically remote from the head end.

DESCRIPTION OF SYSTEM WITH REFERENCE TO DRAWINGS

In FIG. 1, there is a block diagram illustrating in a generalized way the nature of the system signal traffic flow. At the upper right portion of the drawing in FIG. 1 is shown an abbreviated distribution network with a plurality of home terminals 20, school terminals 22 and hospital terminals 24. Two-way capability on a transmission line such as the coaxial cable 26, is permitted by the bridged amplifiers 28. At the far left of the drawing the block 30 represents a CATV transmission center or head end with essentially the same equipment as in a conventional CATV system, augmented as necessary for extended frequency operations. Block 31 includes the CATV system's control center which, together with control units at the individual terminals, provides the versatile two-way communication capabilities described above.

In a conventional CATV system broadcast TV and FM signals obtained from a selected antenna site (input A) and programming originating at the CATV transmission center or head end (input B) are suitably conditioned, i.e., amplified, frequency translated, etc., and distributed over a coaxial cable system for passive reception by subscriber TV and radio sets. Essentially, the same mode of operation is used for broadcast TV signal distribution in the two-way system. It will be appreciated that the system may be equally adaptable to a closed circuit television system in which all material originates at the transmission center.

In a two-way mode, signals originating at one or another terminal transmitted on return channels of cable 26 are diverted via return amplifiers 32 for processing in the control center 31. Forward amplifiers 34 are provided in the general system to amplify signals issuing out of the transmission center 30 for transmission on the forward channels of cable 26. It will be seen that the return amplifiers feed the return signals through suitable filters 36 which are tuned to the various return carrier frequencies. The TV return transmission channels in block 38 are fed to a demodulator 40 and then to a combiner 42 and then back through line 44 to the transmission center 30. The audio return transmission channels 46 are fed to a demodulator 48 and then into the combiner 42. Low frequency data channels are fed from the demodulator 48 to line 50 leading to transmission center 30. The sensor return channels 52 are fed to a computer 54. This computer also receives the service request signals from the interrogation or return control channel 56. The computer 54 is preferably a properly programmed general purpose digital computer.

The computer then can be connected to a data tabulation and recording device 58. The computer also sends the interrogation or command code groups including addresses through a line 60 to the transmission center 30 which places the code groups on the proper carrier and transmits them to the system via the forward control channel of cable 26.

In the operation of this system, among the return signals, there will be, in general, several TV program transmissions initiated at the terminals. While certain applications, e.g., surveillance, might require only reception at the control center, it would ordinarily be desired to distribute the TV program signals over the system to one or more other terminals. Hence, the TV signals, after suitable filtering at 36 to delineate the various channels from each other and from other traffic, would be demodulated at 40 to form a video signal suitable for modulation of a forward transmission channel carrier and subsequent distribution along cable 26. Each return TV transmission channel would be associated with a return audio transmission channel so that terminals other than the one at which a TV program originates could also be authorized audio access to the program.

As with the TV return signals demodulated at 40, the audio return signals are also demodulated at 48 and then combined with the TV video signal at 42 before modulating a forward carrier in the transmission center 30. Additional audio return transmission channels would ordinarily be available for other purposes. In some instances, such a channel could be used for digital signals other than those passing through interrogation or return control channel 56, processed by the computer 54, and the computer output stored on either punched cards or magnetic tape. In some instances, the computer could prepare a response for forward transmission to the appropriate terminals by the control center. Special processing is provided for the signals on the interrogation or return control channel 56, these signals being processed by the computer to prepare the appropriate instruction or command for insertion at the appropriate place in the interrogation forward control channel cycle through the command coding line 60. For certain applications, sensor signals may be returned over channels other than the return control channel associated with the request register in the terminal's control unit, and be processed by the computer and stored in the data tabulation and recording device 58.

Establishment of Two-Way Communication Capability

There are a number of alternative methods for establishing a two-way communication capability in a CATV system. Comparative advantages and disadvantages of these methods depend on specific situations and whether or not there is a completely new system to be installed or whether an existing system with a single coaxial cable is to be updated. The coaxial cable used in most of the currently operating systems is itself a passive bilateral transmission line. However, unilateral electronic amplifiers are placed at regular intervals along the main trunk cable and along distribution legs to compensate for signal attenuation.

A direct means of converting a unidirectional system to a two-way capability is to bridge each unidirectional forward amplifier with a second reverse amplifier as illustrated in FIG. 2. The cable 26 has the general two-way amplifier system 28 which is composed of a forward amplifier 80 and a bypass line 26A and a return amplifier 82 and a bypass line 26B. To prevent oscillations from being generated, the frequency passbands of the two amplifiers are made differently. This is indicated in FIG. 2 by the frequency filter 84 in line 26A having a frequency passband $F_1$ and a frequency filter 86 in line 26B having a frequency passband $F_2$, different from $F_1$.

The frequency range over which coaxial cable is capable of operating extends from DC to upwards of several gigahertz. As a practical matter, however, an upper limit for CATV applications is in the neighborhood of 300 megahertz. Similarly, a lower limit of a few kilohertz avoids the need for DC amplifiers. Present coaxial cables have a capacity of twenty video channels and older cables a capacity of twelve video channels. In either case, only a relatively few channels are actually used for TV program transmission, thereby leaving sufficient channels for the purposes of this invention.

Additional means for arriving at a two directional system may be used. In new installations, of course, a method of establishing a two-way capability is simply to use two cables one reserved for forward channel and the other for the reverse channel. Since the two channels are physically distinct, it is not necessary to use different frequency bands for forward and reverse communication. It is also not necessary to use the same overall bandwidths for the two channels, e.g., it may be economically preferable to use a narrower bandwidth on the reverse channel and, accordingly, less expensive cable and amplifiers could be utilized. It may also be desirable to use two cables for the main trunk line and a single cable with bridging amplifiers or other two-way conversion means for the distribution legs. This system would have the advantage of avoiding the placing of additional emphasis on the signal handling capabilities of main trunk amplifiers.

The spectrum between nominal DC and 300 megahertz can be partitioned between forward and reverse transmission and control channels in many ways, some of which are illustrated in FIG. 3. Spectrum A in FIG. 3 is for reference purposes and shows the FCC broadcast channels allocated for UHF-TV channels 2 through 13 and FM channels 201 through 300. The seven illustrative divisions of the spectrum into forward and reverse channels which follow assume that the UHF-TV and FM broadcast bands are kept in the forward channel; this corresponds to a usual CATV format in a one-way system. It is to be noted, however, that no single locale is served nor is intended to be served by all the allocated TV and FM broadcast channels. Hence, it is not uncommon for a CATV system to translate the carrier frequency of a VHF–TV station and distribute it over the cable in one of the otherwise unused UHF-TV channels. Since the cable does not radiate significantly, it is not essential to maintain the distribution carrier frequencies the same as the broadcast carriers.

It will be noted that channels, B, C, D, E, F, G, and H in FIG. 3 each have a different distribution of frequency so that no two channels are exactly alike. This allows considerable flexibility in accomplishing the various functions of the system.

Terminal Interrogation System

In FIG. 4, there is found a block diagram illustrating the functional operation of the interrogation or digital control subsection 240 of the subscriber's control unit located at each terminal in the system. The several processing steps involved are illustrated using standard digital electronic units. In brief, the basic operations required are as follows:

a. Separation of the forward interrogation or control channel signals from other traffic;

b. Identification of each code group for individual processing;

c. Selection of the code group addressed to each terminal;

d. Decoding of the instruction associated with the properly addressed code group;

e. Storage of a digitally coded service request from the subscriber; and f. Upon interrogation, transmission of the stored request to the control center via the return control channel.

With reference to the drawings, FIG. 4, the interrogation or forward control channel from the control center, on entering the subscriber's terminal control unit from the cable 26, is separated from other channels by filters 140, and the digital interrogation signals are fed along a line 141 to a shift register 142. The leading locator bit of each code group is used to start a digital clock 144 through a line 146, and this clock is used to step the interrogation code group through the shift register 142. When the locator bit reaches the end of the shift register 142, the interrogation code group is then properly positioned in the shift register for further processing. Concurrently, an enabling signal is transmitted along line 150 to cause a comparator 148 to compare the terminal address code positioned in the shift register 142 and the permanently stored terminal identification code represented by the block 149. The next clock pulse shifts the locator bit out of the register 142 and along line 145 to stop the clock and along line 147 to clear the register.

If the addresses do not match, no further processing occurs and the comparison cycle is re-initiated by the locator bit of the next code group. When the address comparison is positive, i.e., the addresses match, the comparator enables a decoder 152 to decode the instruction code subgroup temporarily stored in the register 142. The particular instruction considered here is one corresponding to an inquiry from the control center as to whether any service is requested when this instruction is decoded, a read pulse appears on output line 154. The read pulse on line 154 sets a latch 155 which in turn enables gate 158 to pass clock pulses on line 156. The next code group restarts the clock 144 to transmit clock pulses along line 156 through gate 158 to shift out the contents of the request register 160 to modulate the return channel oscillator 162 which drives the return control channel in cable 26. (The interrogation code groups are longer than the request code groups permitted by the request register capacity. Hence, the clock may be permitted to step interrogation pulses through the shift register concurrently with stepping the request register.) If a video return transmission channel is used, the code pulses themselves may simply be amplified to a suitable level. In either instance, the request code is inserted onto the cable 26 for transmission to the control center.

When the last bit is shifted out of register 160, latch 155 is reset, thereby disabling gate 158. The terminal control unit is now reset for the next interrogation cycle.

The request register may be loaded in several ways, depending on the source of the request. (The "request" may be a response, for example, in a game.) The subscriber himself may load the register by appropriate setting of binary switches represented by block 164. It is preferable that the switches first be set before entry into the register and then a transfer push button 166 be operated to load the register with the request code represented by the set switches. Such an arrangement makes highly unlikely a premature unloading by the interrogation process. (If desired, the request register gate 158 could be disabled during loading to insure against premature unloading.) It may be desired to have the register assume a reference coding configuration automatically after each unloading to provide the control center with a positive "null" response.

The register may also be loaded from digital sensors or sensors equipped with analog-to-digital converters, for example, meter dials, thermometers, or alarms.

While the basic coded inquiry from the control center calls for unloading the request register into the return channel, other instruction codes can be used by the control center to cause other events to occur. The branching point in FIG. 4 is at the decoder 152, that is, the decoder would put an enabling pulse on a different one of the other decoder output lines (labeled "OTHER INSTRUCTIONS") other than the read line 154. This is sufficient to initiate the most complex actions. For example, one decoder output might order a sensor to take a reading, convert the reading if necessary to digital format, and insert it into the request register; the control center would follow this instruction with a request register "read" instruction and then process the returned reading as required.

Another instruction of special importance is one which provides access to a return transmission channel to a modulated oscillator in the terminal; the modulation could be provided by a microphone in the terminal control unit itself or by an external device, e.g., a video camera connected to a jack on the control unit.

FIG. 5 illustrates the RF and other communication circuits contained in the control unit of a typical home terminal and also the relationship of these circuits to the digital control circuits 240 illustrated in FIG. 4. FIG. 5 also illustrates the connections of various peripheral equipment to the control unit in support of various functions and services. Reference numerals from the preceding figures have been used to identify items in FIG. 5 which correspond to items shown in the preceding figures.

Signals are tapped off the signal distribution system via the cable 26 and the RF carrier modulated by a forward interrogation code group or word is channeled into line 141 by a forward control channel pass filter 1. The interrogation signals are then demodulated in a demodulator 180, and the address of each interrogation code is compared in control circuits 240 with the stored terminal identification address.

When an address match is obtained, any terminal request code entered into and stored in the request register in circuits 240 is read out on return line 161 to modulate a return control channel carrier in modulator 162. The modulated signal is passed through an isolating filter 2 and onto the return control channel of cable 26 via line 163.

Concommitant with the reading out of a stored request, the address match enables the control circuits 240 to decode the control instruction subgroup of the interrogation code group and to operate the appropriate gate G to carry out the control instruction.

All entering TV channels are translated to a frequency determined by a tuned circuit 7 before going on to the antenna terminals of the TV set 244; the TV set itself remains tuned to a single channel. The selection of a particular channel is determined through keyboard 164 in control circuits 240 from which the TV channel request is sent to the control center which controls the opening of the proper one of the gates 165 via the forward control channel digital logic control circuits 240. The filters 5 through 6 are narrow band filters, each tuned to a separate local oscillator frequency originating at the head end. Filters 3 through 4 are broad band channel pass filters corresponding to the TV channel carrier frequencies. A particular channel is selected through the operation of one of the gates in the local oscillator group and the corresponding gate in the channel group so that the difference in frequency between the local oscillator from the head end and the TV channel is a frequency to which filter number 7 is tuned. Each time a new channel is selected, the old pair of gates are closed and a new pair is opened.

When a first terminal control unit in response to a request authorizes a second terminal to talk, the proper instruction code is generated by the computer and transmitted over the forward control channel and through filter 1 and demodulator 180 to provide the proper control signal from 240. The output of 240 controls one of a series of gates 169, each of which inserts a proper tuning element to turn on the local oscillator 171 to the proper return transmission frequency associated with the selected TV channel. The microphone output is modulated by a modulator 167 whose output goes on to the cable 26. The audio channel is turned off by an appropriate control word from control circuits 240 by closing the gate 169 which was opened. It is important to note that the two-way audio channel is always under control of the originating terminal which, through its control unit 242, controls which remote station has access to the audio channel associated with the TV program. Therefore, separate audio channels are not required for each of the remote terminals authorized to participate in the TV program.

If the home terminal has been authorized to originate a TV program, a control signal from control circuits 240 opens the gate 173 which allows the signal from a TV camera to be fed to a modulator 246 whose output is fed to the cable 26 at the appropriate return carrier frequency, i.e., in the example, one of three frequencies. In this example, the local oscillator is physically associated with the TV camera rather than being mounted in the control unit 242. The TV program is then transmitted via the head end or transmission center to the one or more terminals authorized by the control center to receive the program. As with the control of the microphone described above, the particular television camera connected to the transmission line is always under control of the originating terminal whose control unit 242 controls operation of the particular gate 173 to determine which television camera has access to the channel.

Remaining functions divide into two categories: (1) sensor read-out, and (2) remote control devices. In the former case, the sensors, such as meter readers, have an analog output which is converted to a digital format by an A to D converter 248. However, the digital output does not get onto the cable until the properly addressed home terminal is authorized to open gate 175 by control circuits 240. The digital signal from the A to D converter then goes through the same modulator 162 as the request word. In the same manner, remote control devices can be turned on and off via a gate signal applied to gate 177. In some cases, the remote control device could be given long term access to the cable through filter 8 at an appropriate frequency not in the bandwidth occupied by the TV channels. A typical illustration of this might be a teletype unit.

Interrogation Channel Processing at the Central Station

FIG. 6 is a functional block diagram illustrating the processing of the interrogation and response signals at the control center. Although a special purpose computer could be assembled using digital electronic units corresponding to the various blocks, it is preferable to program a general purpose computer for this purpose, and to use the computer for other purposes as well.

The functions required for processing the interrogation or control channel signals at the control center are:

a. Cyclic generation of the ordered subscriber addresses, association of each address with the basic inquiry code, and sequential insertion of the list of code groups into the forward control or interrogation channel;

b. Separation of the interrogation return channel signals from other return traffic on the return transmission channels;

c. Identification of the terminals originating each of the return responses received other than a null response;

d. Decoding of return response code, and processing for legitimacy and action;

e. Preparation of appropriate action or command instruction, and formation of the addressed code group to be inserted into the forward control channel; and f. Insertion of the prepared code group into the forward control channel at the proper point in the list calling cycle.

In FIG. 6, there is illustrated a block diagram of a system for accomplishing the various functions above referenced. The subscriber address list, in the form of code groups, each of which contains the basic inquiry instruction, are loaded into the non-destructive, read-only memory block 180 at the lower center of the drawing. This memory is used for read-only purposes except for occasional updating of the subscriber list. The code groups of the subscriber list are called sequentially into an on-line register 182 which, if no modification is called for by the processing logic, is emptied into the forward control or interrogation channel through line 184 and the forward channel modulator 186 to cable 26.

Return channel codes from the terminals are received at the cable entrance at the upper right hand portion of FIG. 6 through the filter 36 and the control or interrogation return channel 56 to an identification block 194 and thence to a decoding block 196. These return channel codes are received and the origin of each code is noted. The ordering of the reserved return channel message segments is known by reason of the send-out order of the interrogation codes on the forward channel, and hence the identification process is essentially one of counting.

In effect then, an addressed code group is formed with an instruction code section containing the request code. This code group is then decoded at 196 and processed as required by the programmed logic at 196 and 198. The logic generates a command or action code group containing the appropriate command or action in an instruction code section. This code group is then stored in a temporary queuing memory 200 preparatory to transmission over the forward control or interrogation channel. In general, there will be several such code groups awaiting processing.

For some service the time to prepare the appropriate command or action code may be long enough so that the ordering in the queuing memory may differ from the proper ordering for insertion into the forward control channel. However, each entry into the queuing memory 200 can be prefixed with a code at 202 indicating its proper order relative to all other addresses, and, accordingly, the entries can be called out in the proper order.

Each entry is called out individually and stored temporarily in a stand-by register 204 connected by a gate 206 to the on-line ready register 182 and also by a comparator 208. Thus, the address of the current entry in this stand-by register is compared with the address of the code group currently in the on-line register. If the addresses do not match, the contents of the on-line register 182, that is, the basic inquiry code, are transferred to the forward channel modulator 186. If the addresses do match, the contents of the stand-by register 204 are transferred to the forward channel through line 210, while the contents of the on-line register are simply erased. The contents of the stand-by register 204 will then appear in the proper place in the calling sequence. When the stand-by register is emptied, the next entry from the queuing memory 200 is called and the processing is repeated.

Except possibly for certain special services, the time needed for the control center to prepare an appropriate command or action code would be short enough compared to the cycling time of the address list (which is itself short) to permit transmission of the response on the address cycle following the cycle on which the service request is received.

FIGS. 7a and 7b are flow charts illustrating the basic processing by the control center of the digital information associated with the interrogation channels.

With reference to FIG. 7a, digital responses sent by various terminals to the control center are suitably demodulated and passed on to the control center computer. Each terminal, when interrogated, issues a response code, if only to indicate that while it is operational, it does not desire any service. The control center, by counting incrementally the number of responses received and consulting the known order in which terminals are interrogated, can identify the source of each response as it is received. This is indicated on the flow chart as updating the ID pointer.

The next step is to preprocess the response. If no service is requested (null request), the computer is not interrupted and continues general background functions, e.g., statistical tabulating, accounting computations, and so forth. It is to be expected that requests for a service will be comparatively infrequent.

If a request for service is received, the computer background processing is interrupted and the request inputted. In addition, the address of the source of the request is obtained from the ID pointer. The request is then decoded and the appropriate command or action instruction obtained from a table or other programming.

The instruction so generated is then stored in a temporary memory (output block) preparatory to transmission on the forward control or interrogation channel.

The flow chart illustrated in FIG. 7*b* is closely associated with the flow chart of FIG. 7*a*.

This flow chart is entered conveniently when transmission of an interrogation word on the forward channel has been completed. The computer then undertakes consideration of the next terminal address to be interrogated during the current interrogation cycle of the system. The address of this next terminal is compared with the address of the oldest entry in the output block. If the addresses are not the same, the basic inquiry code is transmitted. If the addresses do match, the instruction code of the output block word replaces the basic inquiry code before transmission on the forward control channel.

The criterion for selecting the order in which the contents of the output block are compared may be modified if desired. For example, instead of considering the contents in order of age, the output block may be stacked with addresses in the same order as for the calling list. Actually, this will ordinarily be the case since this is the order in which requests are received. Only exceptional requests requiring longer processing times to generate an action or command instruction would be prepared out of order.

The foregoing specification describes a preferred embodiment of a novel CATV system with a two-communication capability and methods of operating the same. Other variations and equivalents of the invention will be apparent to those skilled in the art and are intended to be included within the scope of the invention which is particularly defined in the following claims.

What is claimed is:

1. A two-way closed circuit television system comprising a plurality of remote terminal stations connected to a central transmitting station by means of a transmission line capable of carrying simultaneously a plurality of communication channels including television channels, said system comprising:

a. means coupled to said transmission line for limiting some of said channels, designated as forward channels, to signal transmission in the opposite or return direction, b. a control station connected via said transmission line to said central station and to said plurality of terminal stations for controlling access of said remote terminal stations to said communication channels and comprising a computer for continually and serially transmitting to said remote terminal stations via a forward control channel of said transmission line a list of digital code groups, each code group comprising an instruction word and a terminal address word, c. each terminal station comprising:

1. a digital control unit having a plurality of inputs and outputs and comprising:

a. address storage means for storing the unique address of that terminal station, 2. comparator means coupled to said address storage means for sequentially comparing each of said transmitted terminal address words with the stored unique address, 3. decoder means coupled to said comparator means and responsive to a match between said unique address and a terminal address word for decoding the instruction word in the code group containing the matched address word, and 4. control circuits responsive to the decoded instruction word for controlling access of said terminal station to said plurality of communication channels, d. a television receiver at each said terminal station and adapted to be electrically connected by operation of said digital control unit to selected communication channels of said transmission line, and e. said central transmitting station having means for transmitting on the forward television channels television programs on unique television channel carriers for reception by each television receiver whose terminal station has been granted access to a corresponding unique forward television channel by said control circuits.

2. A two-way closed circuit television system as defined in claim 1 wherein said system is a community antenna television system having a community television antenna connected to said central transmitting station, and said transmission line is a coaxial cable.

3. A two-way closed circuit television system as defined in claim 1 wherein said digital control unit further comprises:

a. a manually operated request code storage means for storing a terminal request code, and b. means responsive to a decoded output of said decoder means for transmitting said request code from said request code storage means via a return control channel of said transmission line to said control station for processing by said computer.

4. A two-way closed circuit television system as defined in claim 3 wherein said request code is a request for access to a predetermined forward television channel, said computer containing program means for determining whether said terminal station is authorized access to said predetermined channel and, if authorization is determined, transmitting on said forward control channel an appropriate instruction word in the code group containing the terminal address word which matches the stored unique address of said terminal station, whereby said instruction word is decoded by said digital control unit to operate said control circuits to electrically connect the television receiver at said terminal station to said predetermined forward television channel for reception of the television program being transmitted thereon.

5. A two-way closed circuit television system as defined in claim 4 further comprising audio input means connected to one of said inputs of said digital control unit, and wherein said request code also contains a request for an audio return channel associated with said predetermined forward television channel, said control circuits being responsive to a decoded instruction word to electrically connect said audio input means to said associated audio return channel to permit two-way voice communication between the requesting terminal station and the authorized other terminal stations, the voice communication on said associated audio return channel being modulated on an audio carrier unique thereto, and all authorized terminal stations having their respective audio input means convertible to said associated audio return channel so that voice communications from all said authorized terminal stations are modulated on said unique audio carrier, the voice communication on said predetermined forward television channel being modulated on the unique television carrier thereof, and means under the control of said computer for designating one of said terminal stations as a control terminal station, the digital control unit of said control terminal station controlling via said computer the access of the other terminal stations to said associated audio return channel.

6. A two-way closed circuit television system as defined in claim 5 further comprising means at said control terminal station for originating said television program, and means for transmitting said television program to said central transmitting station via a return television channel associated with said predetermined forward television channel, whereby said television program is transmitted over said predetermined forward television channel by said program transmitting means at said central transmitting station.

7. A two-way closed circuit television system as defined in claim 3 further comprising a television camera connected to one of said inputs of said digital control unit of a program-originating terminal station, and wherein said request code is a request for access to a pair of predetermined return and forward associated television communication channels for origination and transmission of a special television program to other terminal stations which are authorized by said computer to receive said special program, said computer transmitting over said forward control channel an appropriate instruction word in the code group containing the terminal address word matching the stored unique address of the requesting terminal station where the instruction word is decoded to connect said television camera through the digital control unit and said predetermined return communication channel via said central transmitting station to said predetermined forward communication channel to said authorized other terminal stations, said special television program being retransmitted by said television program transmitting means at said central station on said unique television channel carrier.

8. A two-way closed circuit television system as defined in claim 7 further comprising audio input means connected to one of the inputs of a second digital control unit, and wherein the request code from said second control unit contains a request for an audio communication channel associated with said associated pair of return and forward television channels, the control of said originating terminal station being responsive to a decoded instruction word to electrically connect said audio input means to said audio return and forward television channel of said transmission line to permit two-way voice communication between the second terminal station and the authorized other terminal stations, said voice communication being under control of the digital control unit of said program-originating terminal station so that only a terminal station authorized by said program-originating terminal station has access for voice input to said television program, said voice communication being modulated on said unique television carrier of forward television channel.

9. A two-way closed circuit television system as defined in claim 7 further comprising a second television camera connected to one of the inputs of a second digital control unit, and wherein the request code from said second control unit is a request for the transmission of a second special television program to said authorized terminal stations, the control unit of said program-originating terminal station being responsive to a decoded instruction word to electrically disconnect its television camera from, and connect said second television camera to, said pair of predetermined return and forward television channels, the access of a television camera to said channels being under control of the digital control unit of said program-originating terminal station so that only a terminal station authorized by said program-originating terminal station has access to said channels.

10. A two-way closed circuit television system as defined in claim 3 wherein the digital code groups are arranged in said list in order of increasing distance of the terminal stations from the central transmission station thereby permitting request codes to be returned from the individual terminal stations in the same order as the corresponding interrogation codes so that terminal address words do not have to be associated with the return request codes.

11. A two-way closed circuit television system as defined in claim 1 wherein the tuner of said television receiver is set at a predetermined channel frequency, and said digital control unit comprises means for selecting television programs on said transmission line under the control of said computer and for converting a selected television program carrier frequency to said predetermined channel frequency of said television receiver.

12. A two-way closed circuit television system as defined in claim 1 wherein said digital control unit further comprises an audio oscillator adapted to be modulated by the voice input to a microphone, and means in said digital control unit responsive to an instruction word from said computer to connect said microphone to said audio oscillator, thereby to permit voice signals to be transmitted on a return audio channel in said transmission line, said control station having means comprising filters for separating individual video and audio return channels and then combining corresponding video and audio channel signals and modulating them on said unique television channel carrier for transmission by said transmitting means as said television program on a corresponding forward television channel to other remote stations which are authorized by computer instruction words to receive said program.

13. A two-way closed circuit television system as defined in claim 12 wherein each digital control unit in said system comprises a plurality of audio oscillators preset to different frequencies, the corresponding oscillators in all of said digital control units being preset to the same frequency.

* * * * *

UNITED STATES PATENT OFFICE

CERTIFICATE OF CORRECTION

Patent No. 3,668,307 Dated June 6, 1972

Inventor(s) Face et al

It is certified that error appears in the above-identified patent and that said Letters Patent are hereby corrected as shown below:

Column 15, line 57, after "transmission", insert -- in a forward direction and the other of said channels to signal transmission --.

Signed and sealed this 3rd day of October 1972.

(SEAL)
Attest:

EDWARD M.FLETCHER,JR.
Attesting Officer

ROBERT GOTTSCHALK
Commissioner of Patents

ORM PO-1050 (10-69)

USCOMM-DC 60376-P69
☆ U.S. GOVERNMENT PRINTING OFFICE : 1969 O—366-334